(12) United States Patent
Xu

(10) Patent No.: US 8,416,849 B2
(45) Date of Patent: Apr. 9, 2013

(54) SELF-ADAPTING CODE RATE DISTRIBUTION METHOD OF VIDEO IMAGE MACRO-BLOCK LEVEL

(75) Inventor: Susan Xu, Shenzhen (CN)

(73) Assignee: Shenzhen Temobi Science & Tech Co., Ltd., Shenzhen (CN)

( * ) Notice: Subject to any disclaimer, the term of this patent is extended or adjusted under 35 U.S.C. 154(b) by 0 days.

(21) Appl. No.: 12/745,893

(22) PCT Filed: Nov. 14, 2008

(86) PCT No.: PCT/CN2008/073061
§ 371 (c)(1), (2), (4) Date: Jun. 3, 2010

(87) PCT Pub. No.: WO2009/111935
PCT Pub. Date: Sep. 17, 2009

(65) Prior Publication Data
US 2010/0272171 A1 Oct. 28, 2010

(30) Foreign Application Priority Data
Mar. 11, 2008 (CN) .......................... 2008 1 0065526

(51) Int. Cl.
*H04N 7/44* (2006.01)

(52) U.S. Cl.
USPC ............. 375/240.02; 375/240.03; 375/240.16

(58) Field of Classification Search .............. 375/240.02
See application file for complete search history.

(56) References Cited

PUBLICATIONS

Yu, H. et al.; A Perceptual Bit Allocation Scheme for H.264; IEEE International Conference on Multimedia and Expo; Jul. 6-8, 2005.*

* cited by examiner

*Primary Examiner* — Joseph Ustaris
*Assistant Examiner* — Maria Vazquez Colon

(57) ABSTRACT

A self-adapting code rate distribution method of video image macro-block level is provided. The method carries out analysis processing in units of macro blocks, a bit distribution model which combines bits number of a macro block level with the macro block energy is used, so that the bit distribution of each macro block is combined with the macro block energy, in which the macro block energy is obtained through extracting and abstracting the macro block characters. The above model can primely combine the code rate control arithmetic with the nature character of the image, then the accuracy of the code rate control can be improved, the code quality can be controlled at the same time, and the quality change in space of the image can be smoothed, the image subjective quality can be improved.

7 Claims, 3 Drawing Sheets

SELF-ADAPTING CODE RATE DISTRIBUTION METHOD OF VIDEO IMAGE MACRO-BLOCK LEVEL

FIELD OF THE INVENTION

The present invention relates to the field of bit-rate allocation for video image, especially to a Macroblock Level self-adaptative bit rate allocation method for video image.

BACKGROUND OF THE INVENTION

Bit rate control is one of important techniques in video encoding and plays an important role in applications in the fields of video storage and video transmission. For a limited bit rate, especially a video online transmission with a low bit rate, bit rate control is particularly important and decides the quality of the video encoding directly. In the existing bit rate control methods for video encoding, bit rate control is usually accurate to macroblock level, so as to make the output bit rate of the encoder more accurate. However, conventional bit rate control methods of this kind have high computational complexity and large amount of calculation. Moreover, at the same time when increasing the control accuracy, the non-uniform image quality in space for the same image is resulted due to the non-uniform bit rate allocation. Especially in the condition of wireless/low band-width, such negative effects will be amplified, and the condition of non-uniform image quality resulted by local over-quantification in the image will be very obvious, which may damage the subjective effect of the image greatly.

SUMMARY OF THE INVENTION

The objective of this invention is to overcome the problem of non-uniform macroblock image quality resulted by non-uniform allocation of quantification parameter and bit rate needed by encoding current macroblock, and provide a macroblock level self-adaptative bit rate allocation method to solve the problem of non-uniform quality in image space while ensuring accuracy of bit rate allocation, so as to improve subjective effect.

In order to solve the above-mentioned technical problem, the present invention constructs a macroblock level self-adaptative bit rate allocation method for video image, and comprises following steps:

A. Bit rate control module employs a continuous analysis in space to macroblocks of sampled images and applies specific motion search algorithm, such as diamond motion search algorithm; said bit rate control module uses sobel operators and motion predicted SATD (Sum of Absolute Transform Difference) to calculate macroblock texture complexity factor C, and motion complexity factor $C_m$, respectively;

B. Bit rate control module calculates macroblock energy $E_i$ by using the formula $$E_i = \log_2(C_t + C_m);$$

C. Bit rate control module combines bits of macroblock and macroblock energy by using the formula $$b_{(n,i)} = \frac{E_i}{\sum_{n=0}^{i-1} E_n} \times \frac{i}{N} \times B_n,$$

wherein, $b_{(n,i)}$ is a target bits allocated to the ith macroblock of the nth frame image; i is a index number of the current macroblock within the image; N is the number of macroblocks within the image; $B_n$ is a target bits allocated to the nth frame image; $E_i$ is the ith macroblock energy;

D. In the condition that bits of macroblock has been allocated, bit rate control module calculates quantification parameters $Q_p$ for encoding by using rate distortion model and in macroblock unit.

In said step A, the process for calculating the macroblock texture complexity factor $C_t$ further comprises:

A1-1. Bit rate control module performs sub-pixel sampling on the macroblock;

A1-2. Bit rate control module analyses spatial redundancy of macroblock by using sobel operators, and extracts horizontal component $dx_{i,j}$ and vertical component $dy_{i,j}$ of macroblock boundary vector;

A1-3. For sub-pixel sampled pixel $P_{i,j}$, corresponding boundary vector is $\vec{D}_{i,j} = \{dx_{i,j}, dy_{i,j}\}$, and modulus of boundary direction vector is defined as: $\text{Amp}(\vec{D}_{i,j}) = |dx_{i,j}| + |dy_{i,j}|$ A1-4. Sums modulus of boundary direction vector corresponding to pixels of macroblock sub-pixel sampled to calculate internal variable $T_D$, said variable $T_D$ denotes spatial correlation of the current macroblock, macroblock texture complexity factor $C_t$ is calculated by using the formula $$C_t = \frac{a}{T_D},$$

a is a regulation factor.

In said step A, the process for calculating the macroblock motion complexity factor $C_m$ further comprises:

A2-1. Bit rate control module performs motion search on macroblock of sampled image, wherein, select the previous frame image as reference image, and select diamond motion search algorithm as the motion search method;

A2-2. Calculate difference between macroblock prediction data and original data, and calculate motion complexity factor $C_m$ according to the formula $C_m = b \times \text{SATD}$, wherein, b is a regulation factor.

In said step A1-2, formulas for calculating horizontal component $dx_{i,j}$ and vertical component $dy_{i,j}$ of macroblock boundary direction vector are as follows:

$$dx_{i,j} = p_{i-1,j+1} + 2 \times p_{i,j+1} + p_{i+1,j+1} - p_{i-1,j-1} - 2 \times p_{i,j-1} - p_{i+1,j-1}$$

$$dy_{i,j} = p_{i+1,j-1} + 2 \times p_{i+1,j} + p_{i+1,j+1} - p_{i-1,j-1} - 2 \times p_{i-1,j} - p_{i-1,j+1}$$

wherein, $dx_{i,j}$ and $dy_{i,j}$ represent the horizontal component and vertical component of macroblock boundary direction vector respectively; $P_{i-1,j+1}$ is an adjacent pixel of the pixel $P_{i,j}$.

In said step A2-2, $$SATD = \left( \sum_{i,j} |DiffT(i,j)| \right) \Big/ 2;$$

wherein, SATD (Sum of Absolute Transform Difference) denotes the residual distribution in frequency domain.

In said step A, said sobel operators are $$\begin{bmatrix} -1 & -2 & -1 \\ 0 & 0 & 0 \\ 1 & 2 & 1 \end{bmatrix} \text{ and } \begin{bmatrix} -1 & 0 & 1 \\ -2 & 0 & 2 \\ -1 & 0 & 1 \end{bmatrix}.$$

In said step D, said R-D rate-distortion model is $$B = SAD \times \left( \frac{c1}{Qp} + \frac{c2}{Qp^2} \right),$$

wherein, B is a target bits allocated to the current frame, SAD is the sum of absolute differences of the current macroblock that can be estimated via the macroblock of the previous frame image; $Q_p$ is a quantification parameter of the jth macroblock, c1 and c2 are regulation parameters.

The present invention performs analysis process in macroblock unit, and employs a bit allocation model for combining macroblock level bit allocation and macroblock energy. Such model combines each macroblock bit allocation and macroblock energy, and the model is able to combine bit rate control algorithm and natural characteristics of image efficiently to calculate quantification parameter $Q_p$ for encoding. The smaller $Q_p$ is, the more detail of image will be reserved, and the larger output bit rate of encoder will be, as a result, reconstructed image will more approach people's subjective effects without increasing the network bandwidth. Extracting characteristic of macroblock and abstracting it into macroblock energy make bit rate allocation closely related to macroblock energy. Therefore, it is able to either provide bit rate control accuracy, or control encoding quality meanwhile, as well as smooth quality change of image in space, so as to improve subjective quality of image. The method according to the present invention is particularly suitable for video application under low-bit rate or narrow-band condition, and is independent of specific encoding System. So such method also can be widely used in encoders such as H.264, MPEG-4, etc.

DETAILED DESCRIPTION OF THE PREFERRED EMBODIMENT

These and other aspects of the present invention will become apparent from the following description of the preferred embodiment taken in conjunction with the following drawings. It should be understood that the embodiments described here are only for the purposes of illustration and description and is not intended to be exhaustive or to limit the invention to the precise forms disclosed.

Figure 1:
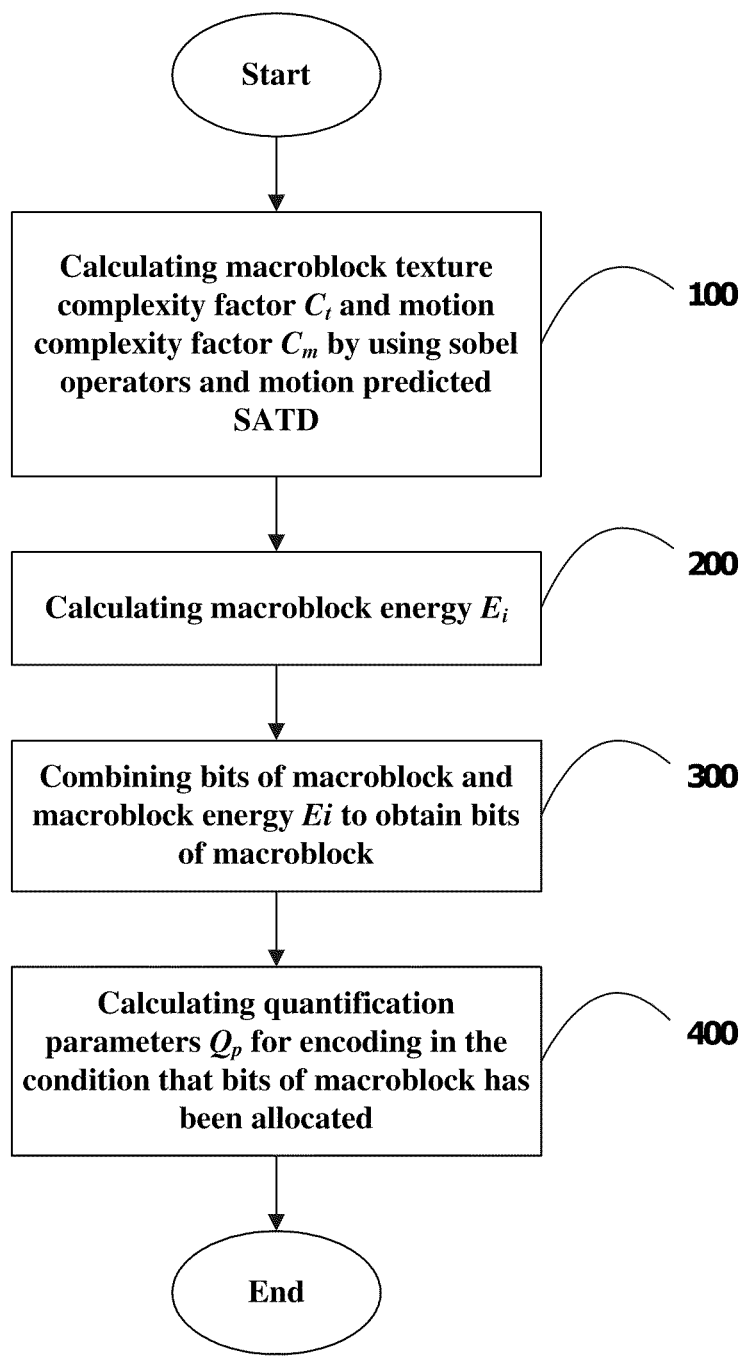
FIG. 1 is a flow diagram for illuminating the performance process of the method according to the present invention.

The present invention implements an analysis to the macroblocks of image, wherein, bit rate control module extracts macroblock texture complexity factor and motion complexity factor respectively, and calculates macroblock energy according to specific method. As shown in FIG. 1, the steps of the method according to the present invention are as follows:

In step 100, the bit rate control module employs a continuous analysis in space to macroblocks of sampled images and applies specific motion search algorithm, such as diamond motion search algorithm; said bit rate control module uses sobel operators and motion predicted SATD (Sum of Absolute Transform Difference) to calculate macroblock texture complexity factor $C_t$ and motion complexity factor $C_m$, respectively.

Figure 2:
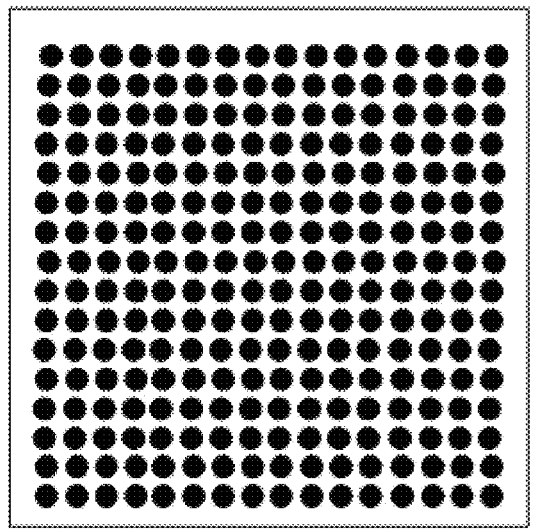
FIG. 2 is a schematic diagram of pixels in one frame image according to the embodiment of the present invention.
Figure 3:
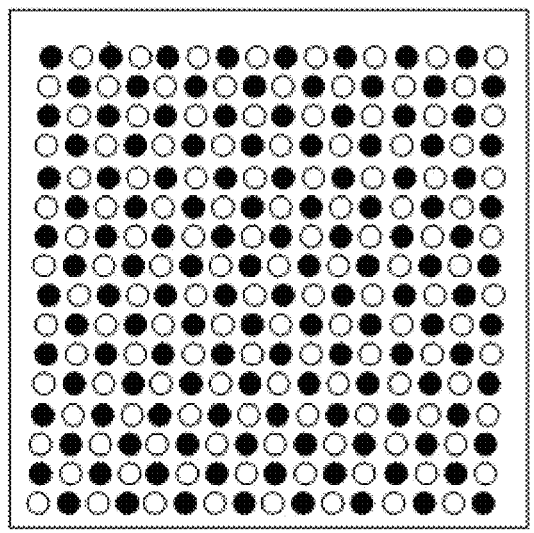
FIG. 3 is a schematic diagram of sub-pixels sampling from one frame image according to the embodiment of the present invention.

Macroblock texture complexity factor is based on correlation and continuity of natural image in space. The character that each pixel forming the image is correlated to peripheral pixels in space can be used for reducing spatial redundancy. If the image spatial redundancy is high, the image encoding complexity is relatively low; and if the image spatial redundancy is low, the image encoding complexity is relatively high. The present invention uses Sobel operators to calculate macroblock texture complexity factor, and sub-pixel samples the pixels in the macroblock for reducing the calculation complexity. The process for calculating macroblock texture complexity factor in this step further comprises:

(1) To reduce calculation complexity, the present invention performs 2:1 sub-pixel sampling on inputted original pixels. Number of sampled pixels is half of number of original pixel, and time consumed by implementing boundary direction vector calculation to the sampled pixels is about half of the before. As shown in FIGS. 2 and 3, in FIG. 2 before sub-pixel sampling, solid circles denote pixels available for sampling, pixel value after sub-pixel sampling is obtained by averaging two adjacent pixels before sampling. For example, after sub-pixel sampling, pixel value in FIG. 3 is equal to the average value of two adjacent original pixel values in FIG. 2 before sub-pixel sampling. Due to the strong correlation of adjacent pixels in space, data after sub-pixel sampling reserve data characteristics of the original image, thus affect algorithm performance very little, and reduce the calculation complexity after sub-pixel sampling significantly.

(2) On the basis of macroblock sub-pixels sampling, analyses spatial redundancy of macroblock and selects Sobel operators $$\begin{bmatrix} -1 & -2 & -1 \\ 0 & 0 & 0 \\ 1 & 2 & 1 \end{bmatrix} \text{ and } \begin{bmatrix} -1 & 0 & 1 \\ -2 & 0 & 2 \\ -1 & 0 & 1 \end{bmatrix}$$

to extract horizontal component and vertical component of macroblock boundary vector. Calculation methods are as follows:

$$dx_{i,j} = p_{i-1,j+1} + 2 \times p_{i,j+1} + p_{i+1,j+1} - p_{i-1,j-1} - 2 \times p_{i,j-1} - p_{i+1,j-1}$$

$$dy_{i,j} = p_{i+1,j-1} + 2 \times p_{i+1,j} + p_{i+1,j+1} - p_{i-1,j-1} - 2 \times p_{i-1,j} - p_{i-1,j+1}$$

wherein, $dx_{i,j}$ and $dy_{i,j}$ represent the horizontal component and vertical component of macroblock boundary vector respectively; $P_{i-1,j+1}$ etc. are the adjacent pixels of pixel $P_{i,j}$.

(3) For pixel $P_{i,j}$ after sub-pixel sampling, corresponding boundary vector is $\vec{D}_{i,j} = \{dx_{i,j}, dy_{i,j}\}$. In order to facilitate calculation, module of boundary direction vector is defined as: Amp $(\vec{D}_{i,j}) = |dx_{i,j}| + |dy_{i,j}|$ (4) Internal variable $T_D$ is obtained by summing module of boundary direction vectors corresponding to pixels of macroblock sub-pixel sampled, and said variable $T_D$ denotes spatial correlation of the current macroblock. Macroblock texture complexity factor $C_t$ is calculated by using the formula $$C_t = \frac{a}{T_D},$$

wherein a is a regulation factor. If current macroblock has high correlation with peripheral macroblocks, macroblock texture complexity is low for encoding; otherwise, macroblock texture complexity is high.

In step 200, bit rate control module calculates macroblock energy E, by using formula $E_i = \log_2(C_t + C_m)$. This step further comprises following steps:

(1) Macroblock motion complexity is motion intensity of the object provided with the macroblock. Method for calculating motion complexity factor is to perform motion search for current macroblock, wherein, the previous frame image is selected as reference image of the present invention, and the motion search method is diamond motion search algorithm.

(2) Calculates difference between macroblock prediction data and original data, and uses motion predicted SATD to calculate motion complexity factor $C_m$: $C_m = b \times SATD$, wherein, b is a regulation factor valued by experience, SATD is the sum of absolute transform difference after motion prediction, $$SATD = \left(\sum_{i,j} |DiffT(i, j)|\right) / 2$$

is the residual distribution in frequency domain.

In step 300, bit rate control module combines bits of macroblock and macroblock energy by using the formula $$b_{(n,i)} = \frac{E_i}{\sum_{n=0}^{i-1} E_n} \times \frac{i}{N} \times B_n,$$

wherein, $b_{(n,i)}$ is a target bits allocated to the ith macroblock of the nth frame image; i is an index number of the current macroblock within the image; N is the number of macroblocks within the image; $B_n$ is a target bits allocated to the nth frame image; $E_i$ is the ith macroblock energy.

In step 400, in the condition that macroblock bit rate has been allocated, bit rate control module calculates quantification parameters $Q_p$ for encoding by using R-D rate distortion model in macroblock unit.

The R-D model is:

$$B = SAD \times \left(\frac{c1}{Qp} + \frac{c2}{Qp^2}\right)$$

wherein, B is a target bits allocated to the current frame, SAD is the sum of absolute differences of the current macroblocks that can be estimated via the macroblocks of previous frame image; $Q_p$ is a quantification parameter of the jth macroblock, c1 and c2 are regulation parameters.

From the above formula, it can be seen that SAD of macroblock complexity is inversely proportional to the quantification parameter $Q_p$ in the condition that the target bits is known, thereby macroblock quantification parameter $Q_p$ can be calculated. The quantification parameter $Q_p$ is an important parameter for encoder to control image compression level, the smaller the quantification parameter $Q_p$ is, the more accurate the quantification is, the higher the image quality is, and the longer the generated bit stream is. The parameter $Q_p$ controls quantifier in encoding, when $Q_p$ decreases, the number of nonzero coefficient increases after the quantification, and bit stream outputted by the encoder becomes bigger. Modifying quantification parameter $Q_p$ via the R-D model dynamically is able to balance complexity of input image and output bit rate, thus making the output bit rate of encoding constant. In accordance with the above methods, bit stream sent to sending buffer is kept constant to a certain extent, and thus achieving the aim of bit rate control.

Figure 4:
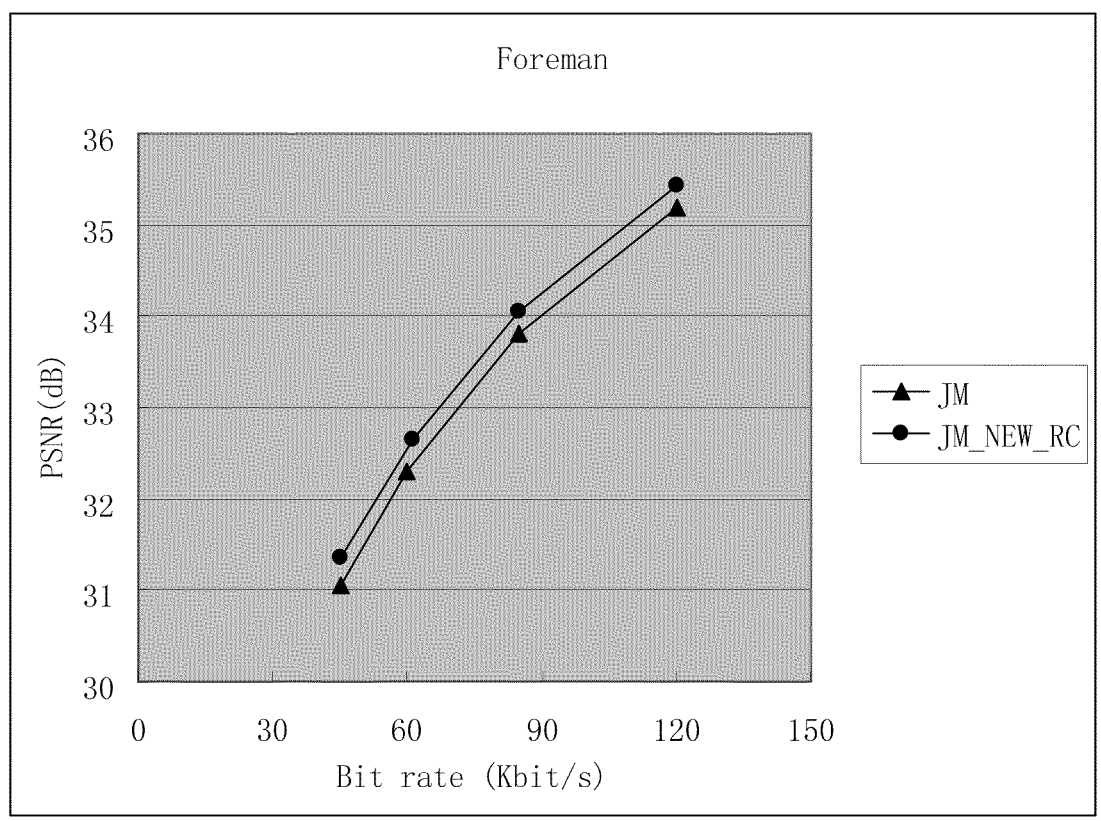
FIG. 4 is a schematic curve diagram showing the rate-distortion according to the present invention.

From experimental results, it can be seen that by using the method according to the present invention, strenuous moving part of encoded image has obvious effect after being compressed, quality of coded image is relatively uniform, and the effect is improved obviously. As shown in FIG. 4, R-D curve of present invention is applied in a reference software JM7.6, PSNR (Peak Signal to Noise Ratio) in the figure refers to the average PSNR of the entire sequence. PSNR is defined as:

$$PSNR = 10 \lg\left(\frac{\psi_{max}^2}{MSE}\right)$$

wherein, $\Psi_{max}$ is the largest intensity of video signal. For the most conventional video with 8 bit per color, $\Psi_{max}$ is equal to 255. It should be noted that PSNR is determined by MSE absolutely for a fixed peak value. PSNR is used more usual than MSE, since people always tend to correlate image quality with a certain PSNR range. As an important principle, for brightness component, image with PSNR higher than 40 dB usually means an excellent image that closely approaches original image; PSNR between 30 and 40 dB usually means a good image and that between 20 and 30 dB means a poor one; and image with PSNR lower than 20 dB is unacceptable. From this figure, it can be seen that PSNR value of the present invention is higher than that of the original image under the same bit-rate, this means that image sharpness is improved without increasing the output bit rate. Experimental results indicated that the encoder is able to obtain a high stability and its R-D accuracy was increased, accordingly, its compression performance was improved.

The foregoing description is just the preferred embodiment of the invention. It is not intended to limit the invention. Any modifications, variations, and amelioration without departing from the spirit and scope of the present invention should be included in the scope of the prevent invention.

What is claimed is:
1. A method of macroblock level self-adaptative bit rate allocation for video image comprising:
step A, employing a continuous analysis in space and a specific motion search algorithm to macroblocks of sampled images, so as to calculate macroblock texture complexity factor $C_t$ and motion complexity factor $C_m$ respectively by using sobel operators and motion predicted SATD;
step B, calculating macroblock energy $E_i$ by using a formula $E_i = \log_2(C_t + C_m)$;

step C, combining macroblock bits and macroblock energy by using a formula $$b_{(n,i)} = \frac{E_i}{\sum_{n=0}^{i-1} E_n} \times \frac{i}{N} \times B_n,$$

wherein, $b_{(n,i)}$ is a target bits allocated to a ith macroblock of a nth frame image; i is a index number of a current macroblock within the image; N is a number of macroblocks within the image; $B_n$ is a target bits allocated to the nth frame image; $E_i$ is a ith macroblock energy;

step D, calculating quantification parameters $Q_p$ for encoding by using R-D rate distortion model in macroblock unit in a condition that bits of macroblock has been allocated;

step E, balancing complexity of the video image and output bit rate of an encoder of the video image via the quantification parameters $Q_p$, thus making the output bit rate of the encoder constant;

Step F, obtaining a video image with uniform quality in image space while ensuring accuracy of bit rate allocation from the encoder with constant output bit rate.

2. The method of macroblock level self-adaptative bit rate allocation for video image according to claim 1, wherein, calculating the macroblock texture complexity factor $C_t$ in step A further comprising:

step A1-1, performing a sub-pixel sampling on the macroblocks;

step A1-2, analyzing a spatial redundancy of the macroblocks by using the sobel operators, and extracting a horizontal component $dx_{i,j}$ and a vertical component $dy_{i,j}$ of a macroblock boundary vector;

step A1-3, for a sub-pixel sampled pixel $P_{i,j}$, defining a corresponding boundary vector as $\vec{D}_{i,j} = \{dx_{i,j}, dy_{i,j}\}$, and a modulus of boundary direction vector as:

$A:mp(\vec{D}_{i,j}) = |dx_{i,j}| + |dy_{i,j}|$

A1-4, summing the modulus of boundary direction vector corresponding to the pixels of macroblock sub-pixel sampled to calculate an internal variable $T_D$ denoting a spatial correlation of the current macroblock, and calculating the macroblock texture complexity factor $C_t$ by using a formula $$C_t = \frac{a}{T_D},$$

wherein, a is a regulation factor.

3. The method of macroblock level self-adaptative bit rate allocation for video image according to claim 1, wherein, calculating the macroblock motion complexity factor $C_m$ in step A further comprising:

step A2-1, performing a motion search on macroblocks of sampled image by selecting a previous frame image as a reference image and using diamond motion search algorithm;

step A2-2, calculating difference between macroblock prediction data and original data, and then calculating the motion complexity factor $C_m$ according to a formula $C_m = b \times SATD$, wherein, b is a regulation factor.

4. The method of macroblock level self-adaptative bit rate allocation for video image according to claim 2, wherein, said step A1-2 further comprising:

defining formulas for calculating horizontal component $dx_{i,j}$ and vertical component $dy_{i,j}$ of macroblock boundary direction vector to be:

$dx_{i,j} = p_{i-1,j+1} + 2 \times p_{i,j+1} + p_{i+1,j+1} - p_{i-1,j-1} - 2 \times p_{i,j-1} - p_{i+1,j-1}$ $dy_{i,j} = p_{i+1,j-1} + 2 \times p_{i+1,j} + p_{i+1,j+1} - p_{i-1,j-1} - 2 \times p_{i-1,j} - p_{i-1,j+1}$ wherein, $dx_{i,j}$ and $dy_{i,j}$ representing a horizontal component and a vertical component of a macroblock boundary direction vector respectively; $P_{i-1,j+1}$ representing an adjacent pixel of the pixel $P_{i,j}$.

5. The method of macroblock level self-adaptative bit rate allocation for video image according to claim 3, wherein, said step A2-2 further comprising defining $$SATD = \left( \sum_{i,j} |DiffT(i,j)| \right) \Big/ 2$$

wherein, SATD denoting a residual distribution in frequency domain.

6. The method of macroblock level self-adaptative bit rate allocation for video image according to claim 1, said step A further comprising:

defining said sobel operators to be $$\begin{bmatrix} -1 & -2 & -1 \\ 0 & 0 & 0 \\ 1 & 2 & 1 \end{bmatrix} \text{ and } \begin{bmatrix} -1 & 0 & 1 \\ -2 & 0 & 2 \\ -1 & 0 & 1 \end{bmatrix}.$$

7. The method of macroblock level self-adaptative bit rate allocation for video image according to claim 1, said step D further comprising:

defining said R-D model to be $$B = SAD \times \left( \frac{c1}{Qp} + \frac{c2}{Qp^2} \right),$$

wherein, B is a target bits allocated to current frame, SAD is a sum of absolute differences of the current macroblocks that can be estimated via macroblocks of previous frame; $Q_p$ is a quantification parameter of the jth macroblock, c1 and c2 are regulation parameters.

* * * * *